Figure 1:
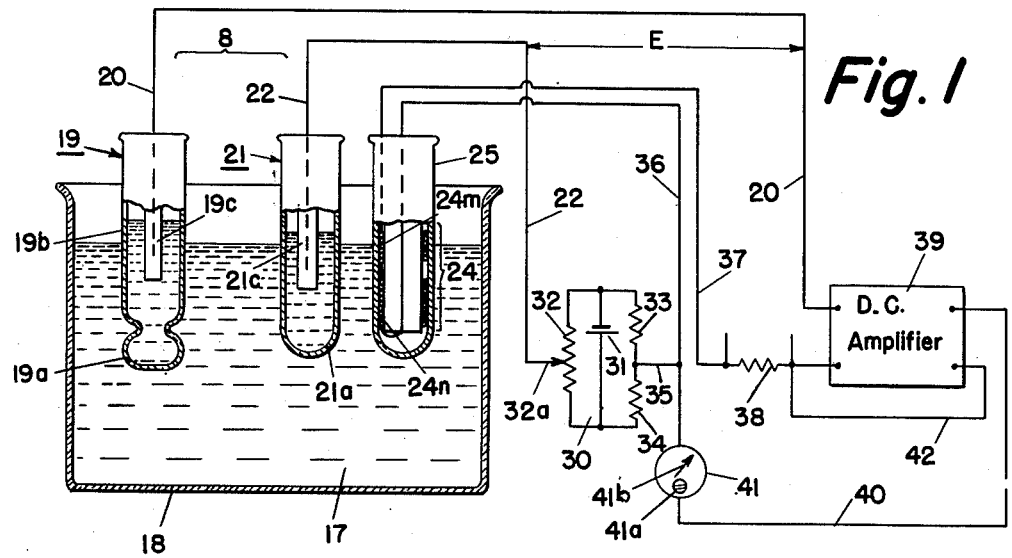

April 6, 1954  A. J. WILLIAMS, JR  2,674,719
TEMPERATURE-COMPENSATING MEASURING SYSTEM
Filed Oct. 18, 1950  2 Sheets-Sheet 1

INVENTOR.
ALBERT J. WILLIAMS, JR.
BY
Woodcock and Phelan
ATTORNEYS

April 6, 1954  A. J. WILLIAMS, JR  2,674,719
TEMPERATURE-COMPENSATING MEASURING SYSTEM
Filed Oct. 18, 1950  2 Sheets-Sheet 2
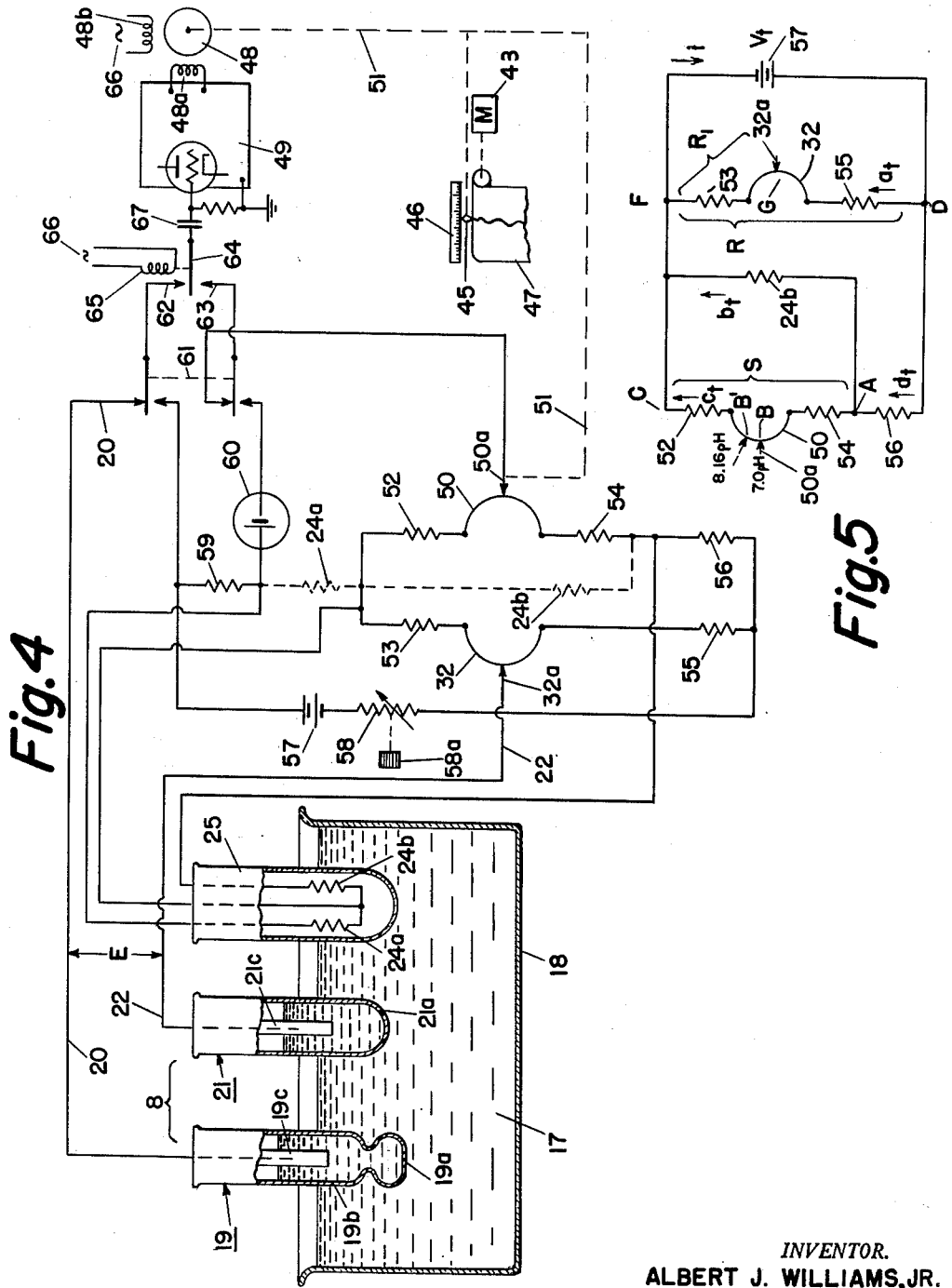
*INVENTOR.*
ALBERT J. WILLIAMS, JR.
BY
Woodcock and Phelan
ATTORNEYS Patented Apr. 6, 1954

2,674,719

UNITED STATES PATENT OFFICE 2,674,719

TEMPERATURE-COMPENSATING MEASURING SYSTEM

Albert J. Williams, Jr., Philadelphia, Pa., assignor to Leeds and Northrup Company, Philadelphia, Pa., a corporation of Pennsylvania Application October 18, 1950, Serial No. 190,816

6 Claims. (Cl. 324—30)

This invention relates to temperature-compensated systems for measurement of the pH values of solutions and has for an object the provision of a system which is at all times fully temperature-compensated, notwithstanding the fact the intersection of the temperature-voltage characteristics of the cell occurs with a voltage output of the cell other than zero.

The response of a glass-electrode-calomel cell is expressed by the equation:

$$e = 0.00019832 \, (\text{pH} - 7.0) \, T \quad (1)$$

where both calomel cells are alike in concentration. If pH values be abscissae, a graph of the voltage of such a cell plotted as ordinates, for a 7 pH solution within the glass electrode, and with varying temperatures, comprises a family of straight lines. Each line has a slope corresponding to a specific value of the temperature of the solution under measurement, and all lines intersect at a zero potential point which occurs at 7 pH value of the solution under measurement.

Where the reference electrode comprises calomel referred to a saturated potassium chloride solution, and the measuring electrode is a glass electrode which contains a calomel half-cell containing a 3.33 N potassium chloride solution, the simple relation of the foregoing equation no longer applies. The applicable equation is:

$$E = 0.00019832 \, (\text{pH} - 7.0) \, T - 0.00023 t \quad (2)$$

where:
$E$ = the potential developed by the electrode system,
$T$ = the temperature, ° Kelvin, of the solution under measurement, and
$t$ = the temperature, ° C., of the solution under measurement.

The foregoing equation gives rise to a difficult problem in measuring pH values where it is desired to have automatic compensation for temperature changes of the solution under measurement, since change of temperature affects both terms of the equation.

In accordance with the present invention, advantage is taken of the fact that the last-mentioned equation will be satisfied by a family of straight lines, each having a slope corresponding to a specific value of temperature, all lines intersecting at a point other than on the zero potential line of the cell, the intersection occurring at the 8.16 pH value of the solution under measurement. In carrying out the invention in one form thereof there is provided in the measuring system a series-circuit including the cell, a source of voltage connected in opposition to that developed by the cell, an adjustable resistor for varying the voltage developed in the series-circuit by the source, and a detector responsive to any unbalance voltage in the series-circuit. Electrically connected with the series-circuit is a temperature-responsive resistor having a temperature-resistance characteristic selected for variation of resistance in accordance with temperature related to the change in voltage of the cell due to change in temperature. The temperature-responsive resistor introduces a compensatory action such that change in temperature of the temperature-responsive resistor does not modify the voltages applied to, or developed in, the series-circuit when the pH value of the cell is at 8.16, but provides automatic temperature compensation for temperature changes of the cell throughout a wide range of other pH values. More particularly, the temperature-responsive resistor may be connected in the series-circuit in a branch separate from that part of the circuit including the detector so that with a pH of the solution under measurement at 8.16, there will be zero current flow in the temperature-responsive resistor. Accordingly, change in the resistance of the temperature-responsive resistor while the solution is at 8.16 pH will not affect the operation of the detector.

In another form of the invention, the temperature-responsive resistor is so connected in an electrical bridge having the requisite circuit values that the voltage introduced into the series-circuit by the network is not affected by change in resistance of the temperature-responsive resistor when the cell is subject to solutions of 8.16 pH, but which is effective automatically to compensate for measurement of solutions of other pH values.

Figure 2:
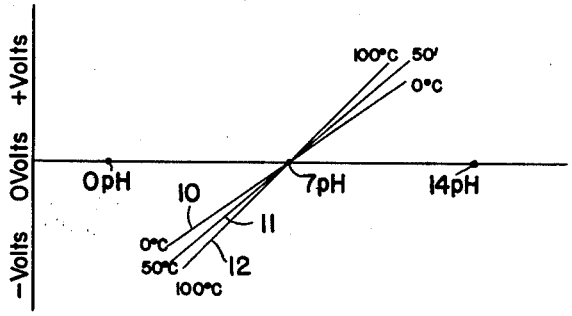
Figure 3:
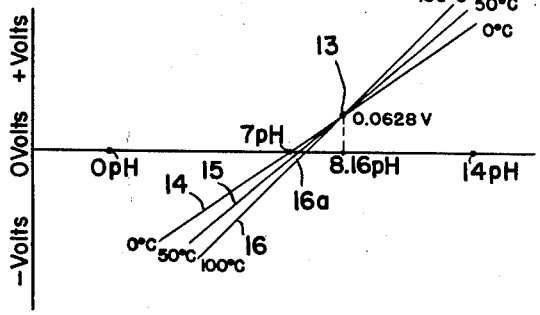

For further objects and advantages of the invention, reference is to be had to the following more detailed description taken in conjunction with the accompanying drawings, in which:

Fig. 1 diagrammatically illustrates one embodiment of the invention;

Figs. 2 and 3 are graphs useful in understanding the invention;

Fig. 4 diagrammatically illustrates a further modification of the invention; and Fig. 5 is a fractional part of the system of Fig. 4.

Reference is again made to Equation 1 which reads:

$$e = 0.00019832 \, (\text{pH} - 7.0) \, T \quad (1)$$

taken in conjunction with Fig. 2 where there is illustrated the family of straight lines which intersect at the point 7 pH of the abscissae, the potential being plotted as ordinates. The three curves 10, 11 and 12 correspond respectively to temperatures of the solution under measurement of 0° C., 50° C., and 100° C. Inasmuch as the family of curves has the common intersection point at 7 pH on the zero output line, compensation for temperature changes of the solution under measurement does not offer the problem arising when the point of intersection is displaced from the zero output line of the cell. For example, in Fig. 3 the point of intersection 13 of the family of curves 14, 15 and 16 is displaced upwardly from the zero output line and occurs at a value of 8.16 pH for the solution under measurement. The family of straight line curves 14—16 of Fig. 3 conforms to Equation 2 discussed above.

In the form of the invention illustrated in Fig. 1, the solution 17 under measurement is illustrated as within a container 18 though it is, of course, to be understood that the solution may be a stream flowing through a pipe or disposed in any suitable container. The glass measuring electrode 19 is shown greatly enlarged and is of conventional construction. Briefly, it consists of a glass membrane 19a attached to a tubular glass support 19b, into which there extends a conductor 20 connected through an inner element 19c containing mercury and calomel to a 7 pH buffer in a 3.33 N potassium chloride solution. The construction of the calomel half-cell may be similar to that of Fig. 2 of Godshalk Patent No. 2,387,727.

The reference electrode 21 may be of construction similar to that of the measuring electrode except for the provision of a microscopically small hole 21a constructed in accordance with Perley Patent No. 2,345,498. An electrical conductor 22 is connected through an inner element 21c also containing mercury and calomel to a saturated potassium chloride solution within the reference electrode 21 and in flow communication through the microscopic opening 21a with the solution under measurement. The measuring electrode 19 may be sealed from the atmosphere, whereas the reference electrode 21 must be open to atmosphere to insure maintenance of flow conditions with respect to the microscopic opening 21a, as well as for convenience in replenishing the supply of the potassium chloride solution.

In order to compensate for changes in the output from the cell comprising the measuring electrode 19 and the reference electrode 21 due to variations in temperature of the solution 17, a temperature-responsive resistor 24, including a manganin coil 24m and nickel coil 24n connected in series-circuit relation, is disposed in thermally conductive relation with the solution 17 under measurement, as through the walls of support 25, as in the case of resistance thermometers. It is to be understood that the resistor 24 may be carried by either of the electrodes 19 or 21, or otherwise disposed in thermal equilibrium with solution 17.

The measuring system includes a series-circuit which may be traced by way of conductor 22 electrically connected to the reference electrode 21, by way of a variable source of voltage 30 including a battery 31 connected in a bridge network formed by a variable resistor 32 and resistors 33 and 34. The series-circuit extends by way of conductors 35 and 36 through the temperature-responsive resistor 24, conductor 37, and by way of a feedback resistor 38 to one side of the input circuit of a direct-current amplifier 39. The other side of the input circuit of the direct-current amplifier is completed by way of conductor 20 to the measuring electrode 19. The direct-current amplifier 39 may be considered a detector of unbalance between the voltage E developed between conductors 20 and 22 and the sum of the voltages developed in the series-circuit opposing that voltage.

More particularly, the output circuit of the direct-current amplifier is connected by way of one output conductor 40, indicating instrument 41, conductor 36, temperature-compensating resistor 24, conductor 37, and feedback resistor 38, and to the other output conductor 42. The potential drop across the resistor 38 will be in a direction opposing the voltage E as will be the potential drop across the temperature-responsive resistor 24.

Typical values of such resistors are as follows: resistor 38 may be 20 ohms, while resistor 24 may be 738.81 ohms, at a temperature of 0° C., and 1016.59 ohms at 100° C., the change being linear between said limits.

Upon any change in voltage output of the cell 8 due to a change in the pH value of the solution 17, a correspondingly increased or decreased output from the detector or direct-current amplifier will result. The change in the potential drop across the resistor 38 and the temperature-responsive resistor 24 will change in the correct direction to equal the new voltage output of the cell 8. Thus, the detector or direct-current amplifier will maintain a potential difference in the series-circuit always equal and opposite to the voltage E, it being understood that the exactness of equality will be of a high order, of degree corresponding with the amplification provided by the amplifier 39.

In order that the temperature compensation shall be effective for the characteristic curves of Fig. 3, the following steps may be performed. A solution 17 having a pH of 8.16 is introduced into the vessel 18. Relative adjustment is then made between resistor 32 and its contact 32a until there is zero current flowing through the circuit including the meter or indicating instrument 41. An ammeter may be included in that circuit for the foregoing indication. A suitable adjusting device is then operated by an adjusting screw 41a to bring the pointer 41b of meter 41 to the 8.16 value on its pH scale. All of the conditions of the graph of Fig. 3 and of Equation 2 will then be satisfied.

At the value of 8.16 pH the voltage developed by potentiometer 30 including the resistor 32 will be equal and opposite to that of cell 8 at 8.16 pH and will reduce to zero the output current through the meter 41.

If with the circuit adjusted as indicated the temperature of the solution 17 be varied over a wide range, it is obvious that the reading of the meter 41 will not change, since any change of resistance of temperature-responsive resistor 24 will be ineffective to produce current flow through meter 41. It does not change the voltage relationship in the series-circuit inasmuch as the voltage of cell 8 by the foregoing adjustments was exactly balanced by the opposing voltage introduced by the setting of the resistor 32 and, hence, no current flows through the part of the series-circuit including resistor 24. However, automatic temperature compensation will be provided for all other values of pH of solution 17.

The foregoing method of adjusting the values of the circuit components to meet the requirements of Equation 2 was adopted because based upon the significant values shown in the graph of Fig. 3. The system may be brought into adjustment in a different manner. If the circuit including the conductor 40 be broken, there will, of course, be zero current flowing through the meter 41. The zero adjuster 41a is then operated until the pointer 41b reads 8.16 pH. The circuit including conductor 40 is closed and a solution of a known pH is then placed in vessel 18 and relative adjustment made between resistor 32 and its contact 32a until the pointer 41b reads the known value of pH of the solution. The system will then be in proper adjustment for measurement of unknown pH values of solution 17.

In Fig. 4 the same reference characters have been applied to like parts, the system being illustrative of the application of the invention to systems used for recorders and indicators of the type in which a pen and pointer 45 is moved relative to a scale 46 and a chart 47 by a motor 48 controlled by detector-amplifier 49. Chart 47 is driven by constant speed motor 43. As in the modification of Fig. 1, the output E from the cell 8 is opposed by a potential difference introduced into a series-circuit including the variable resistor 32. The resistor 32 forms a part of an electrical network or bridge including a measuring or rebalancing slidewire 50 relatively adjustable with respect to its contact 50a by a mechanical connection 51 extending from the motor 48. The bridge includes resistors 52—56, a source of supply such as battery 57, and adjustable resistor 58 in series-circuit therewith.

Instead of the single temperature-responsive resistor 24 of Fig. 1, two temperature-responsive resistors 24a and 24b are utilized in Fig. 4. Their effective electrical connections have been shown in broken lines for ease in understanding their electrical relations to the network. For example, it will be seen that the temperature-compensating resistor 24a is connected in series-circuit relation with the battery 57 through a circuit including a resistor 59, the temperature-compensating resistor 24a having a negative temperature coefficient for purposes hereinafter to be explained. The temperature-compensating resistor 24b has a positive temperature coefficient of resistance and is connected between the juncture of resistors 54 and 56 and a power input side of the bridge adjacent resistor 24a.

In systems of the prior art, circuit changes have been made in the measuring network to compensate for change in the voltage output of the cell due to changes in temperature of the solution under measurement. However, such circuit changes establish new values of current through the measuring network, thus requiring a standardizing operation to bring the measuring circuit into calibration. In accordance with the present invention standardizing operations to maintain the measuring circuit in calibration with change in temperature of the solution under measurement are unnecessary for the reason that constant current conditions of operation are established, and the current flow through the measuring network remains at the same value though the voltage distribution in the measuring network varies in manner to compensate for the variations in voltage output of the measuring cell with wide changes in temperature of the solution under measurement.

Referring to Fig. 4, the manner in which the foregoing results are achieved and the manner in which there is automatic variation in the voltage distribution of the measuring circuit will be described in terms of the measuring requirements of the circuit. For one condition of operation, the temperature-responsive resistor 24b, the resistance of the slidewire branch of the network, i. e., resistor 52, slidewire 50 and resistor 54, the resistor 56, and the resistance of the manually adjustable branch of the network including resistor 53, resistor 32 and resistor 55, must all have resistance values such that with a constant battery current from battery 57, the recorder slidewire 50 will have the necessary voltage gradient. The contact 32a can then be moved to a position on slidewire 32 corresponding with a position of contact 50a relative to slidewire 50 at the position it will occupy for measurement of the solution 17 at 7 pH. The operating conditions thus established will correspond with the intercept of the curve 14 with the zero voltage line of Fig. 3.

The foregoing measuring circuit must, of course, provide the proper potential gradient for the slidewire 50 when the temperature of the temperature-responsive resistor 24b changes from 0° C. to 100° C. Accordingly, the values of the resistors must also be such that when resistor 24b is at 100° C. and with the contacts in the same position as indicated above, the potential of the slidewire contact 50a will change in the positive direction with respect to contact 32a by an amount corresponding with the change in voltage between the intercept of the curve 14 with the zero line to the point 16a at 7 pH on the curve 16 for the condition of 100° C. of the liquid 17.

With the foregoing conditions established, then movement of the contact 50a relative to slidewire 50 to a point corresponding with a value of 8.16 pH of solution 17, system balance should be maintained though the temperature of resistor 24b be varied over a wide range as, for example, from 0° C. to 100° C. Such a result is achieved since the determination of the two conditions discussed in connection with Fig. 3 are adequate to establish proper conditions of operation with change in temperature of the liquid 17 under measurement. It is to be observed that in Fig. 4 there is included in the supply circuit from battery 57 a resistor 59, as well as the resistor 24a having the negative temperature coefficient. Inasmuch as both resistors 24a and 24b, schematically shown in Fig. 4, are disposed in thermal equilibrium with the liquid 17, they will, of course, be maintained at the same temperature as that liquid. Obviously, the resistance of resistor 24a will decrease as the resistance of resistor 24b increases, and vice versa. Accordingly, the current flow from the battery 57 will be maintained at a constant value, at least to a very close approximation.

The principal change in current to the measuring network will be due to the usual causes of current variations from a battery and, hence, there has been provided a standard cell 60, together with a transfer switch 61, which may be operated for standardization of the current flow to the measuring network by adjustment of resistor 58. The standardizing operation can be automatically achieved in manner well understood by those skilled in the art, or it can be manually accomplished as by the knob 58a shown in Fig. 4. Upon operation of the transfer switch 61 from the illustrated position to the lower position, the detector-amplifier 49 will, if adjustment of resistor 58 be needed, energize motor 48 to produce movement of the pen-indicator 45. The knob 58a is rotated until the pen-indicator remains at standstill, at which point it is known that the system is again in proper calibration.

With the above general understanding of the requirements of resistance values, there will now be described the manner in which a particular set of resistance values may be found to meet the requirements above set forth, it being understood that the general circuit theory and the calculations hereinafter to be set forth are to be taken as exemplary of the principles involved. They may be extended to other applications having similar circuit requirements.

For purposes of analysis, reference may be had to Fig. 5 which is a somewhat simplified fractional part of the system of Fig. 4. Pursuant to the foregoing analysis, one of the conditions of operation is that the current $i$ is held constant notwithstanding changes in temperature of the solution 17, this result being accomplished by the opposite action of the temperature-responsive resistors 24a and 24b, the periodic standardization, of course, taking care of slow variations of the voltage of battery 57. Further in accordance with the foregoing analysis, the voltage between the point B of slidewire 50 and the point G of the adjustable resistor 32 must be such as to satisfy the following equation:

$$V_{BG} = 0.00023t \quad (3)$$

where the point B is positive with respect to the point G, that is to say, of the correct polarity to oppose the voltage of the cell 8. The point B' on slidewire 50 is selected so that the voltage between B' and G shall be equal to $$V_{B'G} = -0.062827 \quad (4)$$

with a polarity of B' negative with respect to G. For this condition, the voltage introduced into the network between contacts 50a and 32a at positions B' and G will be equal and opposite to the voltage of the cell 8 which will be developed for a pH of the solution 17 of 8.159 (previously referred to for convenience as 8.16).

The point B being midway in resistance between A and C, the following relationship holds:

$$R_{BC} = \tfrac{1}{2}S \quad (5)$$

where S is the total resistance between points A and C.

If it be assumed that the range of pH values to be measured by the cell 8 shall extend from 0 to 14, the resistance between the points A and C may be expressed in terms of pH units. (This will correspond with the recorder range, if the total resistance between A and C be provided by slidewire 50; a lesser range of the recorder will be provided by the use of end coils 52 and 54.) Since the total resistance between points A and C is proportional to pH values, and since the total range is assumed to be 0 to 14 with the point B' corresponding with 8.159 pH and point A corresponding with 0 pH, the following equation can be written:

$$R_{B'C} = \frac{14.000 - 8.159}{14} S = 0.4172 S \quad (6)$$

The current through the three branches of the circuit is always equal to the current flowing from the battery 57, or, $$i = a_t + b_t + c_t \quad (7)$$

From inspection it will also be seen that the current $d_t$ flowing through the resistor 56 will be equal to the sum of the currents flowing in the two circuit branches therefrom, or, $$d_t = b_t + c_t \quad (8)$$

From Equation 3 it will also be seen that the potential from C to B is equal to the potential from F to G plus $0.00023t$. Hence, the following relationship holds:

$$\tfrac{1}{2} S c_t = R_1 a_t + 0.00023t \quad (9)$$

The voltage from cell 8 for a pH change of 1, in the absence of effects due to change of temperature of the solution under measurement, from Nernst's law, could be expressed:

$$E_t = At \quad (10)$$

where:
A is a constant equal to 0.00019842, and
T is in degrees Kelvin.

Accordingly, $$E_t = .00019842 \, (273.16t) \quad (11)$$

Then the potential across the resistance of the branch S may be expressed:

$$S c_t = 14 E_t \quad (12)$$

this relationship holding since $E_t$ corresponds to a potential for a 1 pH change, and the total potential across the branch S corresponding with the potential at 14 pH. From inspection then, the additional equation may be written:

$$S C_t + R_{56} d_t = R a_t \quad (13)$$

Similarly, the additional equation can be written:

$$S c_t = R_{24b} b_t \quad (14)$$

With the above equations, the following conditions may be assumed for a pH variation from 0 to 14:

At 0° C.

$t = 0$
$S = 420.0000$ ohms
$E_0 = 0.054200$ volt
$R_{24b} = 100.4000$ ohms

At 100° C.

$t = 100$
$S = 420.0000$ ohms
$E_{100} = 0.074042$ volt
$R_{24b} = 161.5000$ ohms The above equations may be solved simultaneously as well understood by those skilled in the art. The results, with the above conditions assumed, are as follows:

$R_{56} = 13.779$ ohms
$R\ = 567.529$ ohms
$R_1\ = 242.523$ ohms

The resistance value for the temperature-responsive resistor 24b has already been given for 0° C. and for 100° C. For temperatures of 25° C., 50° C. and 75° C., the resistance values of resistor 24b will be as follows:

113.86
128.43
144.24

The resistor 24b of Fig. 4, comprising the following components has been found entirely satisfactory to meet the above conditions of operation.

Resistor 24b includes a 100.24 ohm nickel coil in series with a manganin coil of .16 ohm, these values being typical for one embodiment of the invention, some variation in each coil being permissible, while still retaining the temperature compensation needed in the network to meet the above-stated conditions.

The foregoing calculations and the values set forth are to be taken as exemplary and not as the only possible solutions of the requirements of the system. For example, for a range of −1 pH to 15 pH, and with a value of $S=480.0000$ ohms both at 0° C. and 100° C., and with the same assumptions as given above, resistor 56 may have a value of 11.76 ohms and resistance R, 483.81 ohms. $R_1$ will be 211.88 ohms.

With either sets of values indicated above, the resistance of the resistor 24a having the negative resistance-temperature coefficient will be 52.4 ohms at 0° C. and 27.0 ohms at 100° C. It may comprise a carbon resistor which has a negative temperature coefficient of nominally 100 ohms resistance at 25° C. shunted by a 75 ohm resistor of manganin.

With the resistance values established for the circuit components of Fig. 4, the system itself will function continuously to indicate on scale 46 and to record on chart 47 changes in the pH value of the solution 17. Any change in pH value of solution 17 causes a change in the voltage of cell 8. Accordingly, there will be an unbalance or difference voltage appearing between stationary contacts 62 and 63 of a converter or vibrator having a movable contact 64 driven by a coil 65 energized from a suitable alternating-current source of supply as indicated at 66. The converter or vibrator applies to the condenser 67 a pulsating signal of polarity depending upon the direction of change in the voltage of cell 8 and of amplitude related to the extent of change. The applied signal is amplified by the amplifier 49 and a motor winding 48a energized for rotation of motor 48, the other winding 48b of which is energized from the same source of supply as the vibrator as indicated at 66. The motor, through mechanical connection 51, positions the pen-indicator 45 and also relatively positions the slidewire 50 and its contact 50a to rebalance the system and to reduce to zero the input signal to the amplifier 49. While the mechanical connection has been illustrated as applied to the movable contact 50a, it is to be understood that either the slidewire 50 or contact 50a may be adjusted.

For additional details of construction of the amplifier 49, reference may be had to Williams Patent No. 2,367,746.

Change in temperature of the solution 17 does not introduce error into the measurement of the pH of the solution by reason of the operation of the measuring system with the values of the circuit components established as already set forth in detail. Any change in temperature of solution 17 produces a change in temperature of the resistors 24a and 24b, both functioning together to maintain constant the current flowing to and from the network. The temperature-responsive resistor 24b performs the additional function of so shifting the potential gradients of the bridge exactly to compensate for change in the voltage of cell 8 due solely to temperature changes of solution 17. Thus, if there be a rise in temperature of solution 17, there will be a corresponding rise in resistance of resistor 24b. Less current, $b_t$, will flow through the branch including resistor 24b, while somewhat greater currents, $a_t$ and $c_t$ will flow in the branches respectively including the adjustable resistor 32 and the slidewire resistor 50.

The change in potential gradients will be effective to change the potential introduced into the measuring circuit as between contacts 32a and 50a for all values of pH other than 8.16. For that value, change in the resistance of resistor 24b does not change the voltage between contacts 32a and 50a. In this connection, with the contact 50a at a position corresponding to the 8.16 pH value, the effects of change in the currents of the three branches of the circuit balance out, that is, they do not change the potential difference introduced into the measuring network. However, with the contact 50a at any other position on slidewire 50, the potential difference between contacts 32a and 50a does change to the same degree as the change in voltage of cell 8 due solely to temperature changes of solution 17.

While preferred embodiments of the invention have been described in detail, it is to be understood the invention is not limited thereto, since with the above understanding of the principles involved, changes may be made in the values of the circuit components and some changes may be made in the circuitry itself, such as the establishment of different values for the end coils 52, 54, 53 and 55 of the measuring network, or such end coils can be omitted and the resistance of the respective branches established by the slidewires 32 and 50. If the resistance S, from A to C of Fig. 5, be chosen to be substantially different than given above, as for example, doubled, the other values of resistors will widely differ from those above set forth but they may be readily calculated. It is to be further understood that with other pH values of the solution in the measuring electrode, the point of intersection of the temperature-voltage-pH curves will occur at other than 8.16 pH. The invention is applicable to all such applications where the voltage output of cell 8 when subjected to that pH value of solution under measurement other than the pH value of the solution within the measuring electrode produces a voltage of predetermined value other than zero and at which change in temperature of the cell has no effect on its output voltage.

What is claimed is:

1. A measuring circuit for a cell including a measuring electrode and a reference electrode in which circuit a voltage is opposed to the voltage of the cell and in which circuit there is provided compensation for change in voltage of the cell with change in temperature of the solution under measurement comprising a network having a source of current supply, a first branch including a slidewire resistor, a second branch including a measuring slidewire resistor and a resistor in series relation with each other and in parallel relation with said first branch, said slidewire resistors having contacts for deriving the opposing voltage from said network, a temperature-responsive resistor in shunt with that part of said second branch which excludes said series resistor for controlling the division of current flow between said first and second branches, means for maintaining at a constant value the current flowing to said network during a wide range of temperature changes of said temperature-responsive resistor, and the relative values of resistance of said first and second branches, of said series resistor, and of said temperature-responsive resistor, being so selected that with changes in resistance of said temperature-responsive resistor a finite value of voltage derived from said network other than zero between said contacts of said measuring slidewire and of said slidewire resistor will remain constant throughout a wide change of resistance of said temperature-responsive resistor.

2. A measuring circuit for a cell including a measuring electrode and a reference electrode in which circuit a voltage is opposed to the voltage of the cell and in which circuit there is provided compensation for change in voltage of the cell with change in temperature of the solution under measurement comprising a network having a source of current supply, a first branch including a slidewire resistor, a second branch including a measuring slidewire resistor and a resistor in series relation with each other and in parallel relation with said first branch, said slidewire resistors having contacts for deriving the opposing voltage from said network, a temperature-responsive resistor in shunt with that part of said second branch which excludes said series resistor for controlling the division of current flow between said first and second branches, means for maintaining at a constant value the current flowing to said network during a wide range of temperature changes of said temperature-responsive resistor, said series resistor having a resistance which is low relatively to the resistance of that part of said second branch shunted by said temperature-responsive resistor and to said first branch, and the relative values of resistance of said first and second branches, of said series resistor, and of said temperature-responsive resistor being so selected that with changes in resistance of said temperature-responsive resistor a finite value of voltage derived from said network other than zero between said contacts of said measuring slidewire and of said slidewire resistor will remain constant throughout a wide change of resistance of said temperature-responsive resistor.

3. A measuring circuit for a cell including a measuring electrode and a reference electrode in which circuit a voltage is opposed to the voltage of the cell and in which circuit there is provided compensation for change in voltage of the cell with change in temperature of the solution under measurement comprising a network having a source of current supply, a first branch including a slidewire resistor, a second branch including a measuring slidewire resistor and a resistor in series relation with each other and in parallel relation with said first branch, said slidewire resistors having contacts for deriving the opposing voltage from said network, said first branch having a resistance somewhat higher than said second branch, a temperature-responsive resistor in shunt with that part of said second branch which excludes said series resistor for controlling the division of current flow between said first and second branches, means for maintaining at a constant value the current flowing to said network during a wide range of temperature changes of said temperature-responsive resistor, said series resistor having a resistance which is low relatively to the resistance of that part of said second branch shunted by said temperature-responsive resistor and to said first branch, and the relative values of resistance of said first and second branches, of said series resistor, and of said temperature-responsive resistor being so selected that with changes in resistance of said temperature-responsive resistor a finite value of voltage derived from said network other than zero between said contacts of said measuring slidewire and of said slidewire resistor will remain constant throughout a wide change of resistance of said temperature-responsive resistor.

4. A measuring circuit for a cell including a measuring electrode and a reference electrode in which circuit a voltage is opposed to the voltage of the cell and in which circuit there is provided compensation for change in voltage of the cell with change in temperature of the solution under measurement comprising a network having a source of current supply, a first branch including a slidewire resistor, a second branch including a measuring slidewire resistor and a resistor in series relation with each other and in parallel relation with said first branch, said slidewire resistors having contacts for deriving the opposing voltage from said network, a temperature-responsive resistor in shunt with that part of said second branch which excludes said series resistor for controlling the division of current flow between said first and second branches, means including a resistor having a negative temperature-resistance coefficient connected in series circuit relation with said branches for maintaining at a constant value the current flowing to said network during a wide range of temperature changes of said temperature-responsive resistor, and the relative values of resistance of said first and second branches, of said series resistor, and of said temperature-responsive resistor being so selected that with changes in resistance of said temperature-responsive resistor a finite value of voltage derived from said network other than zero between said contacts of said measuring slidewire and of said slidewire resistor will remain constant throughout a wire change of resistance of said temperature-responsive resistor.

5. A system for measuring the pH values of solutions with a pH responsive cell which develops a finite voltage independent of temperature when subjected to a solution having an unique pH value and whose voltage output varies with change of pH values and with temperature at other than said unique value, comprising a measuring network having circuit connections for said cell including a source of voltage, circuit components for developing in circuit with said cell an opposing measuring voltage, certain of said components establishing in circuit with said cell an additional opposing voltage equal in magnitude to that developed by said cell when subjected to a solution having said unique pH value, certain of said components being disposed in heat-exchange relation with said solution and connected in said measuring network for varying in accordance with temperature changes of said cell the magnitude of one of said opposing voltages only when said cell is subjected to a solution whose pH value differs from said unique pH value.

6. In the measurement of pH values of solutions with a pH responsive cell which develops a finite voltage independent of temperature when subjected to a solution having an unique pH value and whose voltage output varies with change of pH values and with temperature at other than said unique value, the method which comprises applying in opposition to the voltage of said cell a finite voltage equal in magnitude to that developed by said cell when subjected to a solution having said unique pH value, detecting a difference voltage upon change in the voltage of said cell due to change in the pH value of the solution to which it is subjected, applying a further voltage in opposition to that of said cell to reduce said detected difference voltage to zero, and varying the magnitude of one of said opposing voltages when said cell is subjected to other than said unique pH value in accordance with temperature changes of said cell in compensation for variation in the output of said cell due solely to temperature changes.

References Cited in the file of this patent

UNITED STATES PATENTS

| Number | Name | Date |
|---|---|---|
| 1,472,125 | Keeler | Oct. 30, 1923 |
| 2,099,298 | Fracker | Nov. 16, 1937 |
| 2,232,211 | Cary | Feb. 18, 1941 |
| 2,383,450 | Coleman | Aug. 28, 1945 |